United States Patent
Jheng et al.

(10) Patent No.: US 10,182,379 B2
(45) Date of Patent: Jan. 15, 2019

(54) OFFLOADABILITY OF PDN CONNECTION FOR LTE-WLAN INTERWORKING CONTROL AND MANAGEMENT

(71) Applicant: MEDIATEK INC., Hsinchu (TW)

(72) Inventors: Yu-Syuan Jheng, Taipei (TW); Pavan Santhana Krishna Nuggehalli, San Carlos, CA (US); Chien-Chun Huang-Fu, Hsinchu (TW)

(73) Assignee: HFI Innovation INC., HsinChu (TW)

( * ) Notice: Subject to any disclaimer, the term of this patent is extended or adjusted under 35 U.S.C. 154(b) by 386 days.

(21) Appl. No.: 15/008,236

(22) Filed: Jan. 27, 2016

(65) Prior Publication Data

US 2016/0219470 A1    Jul. 28, 2016

Related U.S. Application Data

(60) Provisional application No. 62/108,630, filed on Jan. 28, 2015.

(51) Int. Cl.
*H04W 36/00* (2009.01)
*H04W 24/02* (2009.01)
(Continued)

(52) U.S. Cl.
CPC ....... *H04W 36/0083* (2013.01); *H04W 24/02* (2013.01); *H04W 24/08* (2013.01);
(Continued)

(58) Field of Classification Search
CPC . H04W 36/0083; H04W 76/16; H04W 24/02; H04W 24/08; H04W 24/10; H04W 28/085; H04W 28/12; H04W 36/00; H04W 36/14; H04W 36/165; H04W 36/22; H04W 84/12; H04W 88/06
See application file for complete search history.

(56) References Cited

U.S. PATENT DOCUMENTS

| | | |
|---|---|---|
| 9,439,050 B2 | 9/2016 | Ward et al. |
| 2009/0245176 A1 | 10/2009 | Balasubramanian et al. ............... 370/328 |

(Continued)

FOREIGN PATENT DOCUMENTS

| | | |
|---|---|---|
| CN | 102165837 A | 8/2011 |
| CN | 102577459 A | 7/2012 |

(Continued)

OTHER PUBLICATIONS

USPTO, Office Action for related U.S. Appl. No. 15/008,203 dated Sep. 7, 2017 (13 pages).

(Continued)

*Primary Examiner* — Melvin C Marcelo
(74) *Attorney, Agent, or Firm* — Imperium Patent Works; Zheng Jin; Mark Marrello

(57) ABSTRACT

Methods for LTE-WLAN interworking control and management are proposed. In one novel aspect, a terminal equipment (TE) can use an AT command to query the WLAN offloadability of a packet data network (PDN) connection. A mobile termination (MT) can store the WLAN offloadability indication in its memory and return the value to TE upon receiving the AT command. In one example, a new field <WLAN_Offload> can be added to an existing AT command.

20 Claims, 13 Drawing Sheets

(51) Int. Cl.
  *H04W 24/08* (2009.01)
  *H04W 24/10* (2009.01)
  *H04W 28/08* (2009.01)
  *H04W 36/16* (2009.01)
  *H04W 28/12* (2009.01)
  *H04W 36/14* (2009.01)
  *H04W 76/16* (2018.01)
  *H04W 84/12* (2009.01)
  *H04W 88/06* (2009.01)
  *H04W 36/22* (2009.01)

(52) U.S. Cl.
  CPC ......... *H04W 24/10* (2013.01); *H04W 28/085* (2013.01); *H04W 28/12* (2013.01); *H04W 36/00* (2013.01); *H04W 36/14* (2013.01); *H04W 36/165* (2013.01); *H04W 76/16* (2018.02); *H04W 36/22* (2013.01); *H04W 84/12* (2013.01); *H04W 88/06* (2013.01)

(56) References Cited

U.S. PATENT DOCUMENTS

| | | | |
|---|---|---|---|
| 2011/0235614 A1 | 9/2011 | Lerzer et al. | 370/331 |
| 2012/0082095 A1 | 4/2012 | Sun | 370/328 |
| 2012/0129500 A1 | 5/2012 | Rajadurai et al. | 455/411 |
| 2013/0016696 A1 | 1/2013 | Adjakple et al. | 370/328 |
| 2013/0183996 A1 | 7/2013 | Scarr et al. | 455/453 |
| 2014/0192651 A1* | 7/2014 | Sun | H04L 45/38 370/235 |
| 2014/0233386 A1 | 8/2014 | Jamadagni et al. | 370/235 |
| 2014/0286310 A1 | 9/2014 | Lerzer et al. | 370/331 |
| 2015/0271708 A1 | 9/2015 | Zaus et al. | 370/230 |
| 2015/0327139 A1 | 11/2015 | Sirotkin et al. | 370/332 |
| 2016/0066253 A1 | 3/2016 | Kollu et al. | 370/328 |
| 2016/0135100 A1 | 5/2016 | Teyeb et al. | 370/331 |
| 2017/0215105 A1 | 7/2017 | Bergström et al. | |

FOREIGN PATENT DOCUMENTS

| | | |
|---|---|---|
| CN | 103179685 A | 6/2013 |
| CN | 103517255 A | 1/2014 |
| WO | WO2011134408 A1 | 11/2011 |
| WO | WO2012112571 A1 | 8/2012 |
| WO | WO2014182211 A1 | 11/2014 |

OTHER PUBLICATIONS

International Search Report and Written Opinion of International Search Authority for PCT/CN2016/072492 dated Apr. 28, 2016 (11 pages).
3GPP TS 27.00 V12.7.0; 3rd Generation Partnership Project; Technical Specification Group Core Network and Terminals; AT Command Set for User Equipment (UE) 3GPP TS 27.007 (Release 12).
International Search Report and Written Opinion of International Search Authority for PCT/CN2016/072493 dated Apr. 28, 2016 (11 pages).
International Search Report and Written Opinion of International Search Authority for PCT/CN2016/072494 dated Apr. 28, 2016 (11 pages).
3GPP TS 27.007 V12.7.0 (Dec. 2014), 3rd Generation Partnership Project; Technical Specification Group Core Network and Terminals; AT Command Set for User Equipment (UE) (Release 12).
USPTO, Office Action for related U.S. Appl. No. 15/008,166 dated Sep. 27, 2016 (9 pages).

* cited by examiner

| COMMAND | POSSIBLE RESPONSE(S) |
|---|---|
| +CIWREP=[<n>] (SET) | |
| +CIWREP? (READ) | +CIWREP: <n>[,<threshRSCPLow>,<threshRSCPHigh>[,<threshEcnoLow>,<threshEcnoHigh>[,<threshRSRPLow>,<threshRSRPHigh>[,<threshRSRQLow>,<threshRSRQHigh>[,<threshChUtilLow>,<threshChUtilHigh>[,<threshBackhRateDLLow>,<threshBackhRateDLHigh>[,<threshBackhRateULLow>,<threshBackhRateULHigh>[,<threshBeaconRSSILow>,<threshBeaconRSSIHigh>[,<opi>[,<tSteering>[,<WLANidentifierListLength>[,<ssid_1>,<bssid_1>,<hessid_1>][,<ssid_2>,<bssid_2>,<hessid_2>][,......]]]]]]]]]]]] |
| +CIWREP=? (TEST) | +CIWREP: (list of supported <n>s),(list of supported <threshRSCPLow>s),(list of supported <threshRSCPHigh>s),(list of supported <threshEcnoLow>s),(list of supported <threshEcnoHigh>s),(list of supported <threshRSRPLow>s),(list of supported <threshRSRPHigh>s),(list of supported <threshRSRQLow>s),(list of supported <threshRSRQHigh>s),(list of supported <threshChUtilLow>s),(list of supported <threshChUtilHigh>s),(list of supported <threshBackhRateDLLow>s),(list of supported <threshBackhRateDLHigh>s),(list of supported <threshBackhRateULLow>s),(list of supported <threshBackhRateULHigh>s),(list of supported <threshBeaconRSSILow>s),(list of supported <threshBeaconRSSIHigh>s),(list of supported <tSteering>s),(list of supported <WLANidentifierListLength>s) |

FIG. 5

| Command | Possible response(s) |
|---|---|
| +CIWREP=[<reporting>] | |
| +CIWREP? (option b1) | +CIWREP: <reporting>,(list of <Threshold>s) |
| +CIWREP? (option b2) | +CIWREP: <reporting>,(list of <Threshold>s),list of <Current RAN value>s |
| +CIWREP=? | +CIWREP: (list of supported <reporting>s) |

FIG. 6

| INDEX | Parameters | Description |
|---|---|---|
| 0 | Thresh $_{ServingOffloadWLAN, LowP}$ | This specifies the RSRP threshold (in dBm) used by the UE for traffic steering to from E-UTRAN to WLAN |
| 1 | Thresh $_{ServingOffloadWLAN, HighP}$ | This specifies the RSRP threshold (in dBm) used by the UE for traffic steering from WLAN to E-UTRAN |
| 2 | Thresh $_{ServingOffloadWLAN, LowQ}$ | This specifies the RSRQ threshold (in dB) used by the UE for traffic steering from E-UTRAN to WLAN |
| 3 | Thresh $_{ServingOffloadWLAN, HighQ}$ | This specifies the RSRQ threshold (in dB) used by the UE for traffic steering from WLAN to E-UTRAN |
| 4 | Thresh $_{ChUtilWLAN, Low}$ | This specifies the WLAN channel utilization (BSS load) threshold used by the UE for traffic steering from E-UTRAN to WLAN |
| 5 | Thresh $_{ChUtilWLAN, High}$ | This specifies the WLAN channel utilization (BSS load) threshold used by the UE for traffic steering from WLAN to E-UTRAN |
| 6 | Thresh $_{BackhRateDLWLAN, Low}$ | This specifies the backhaul available downlink bandwidth threshold used by the UE for traffic steering from WLAN to E-UTRAN |
| 7 | Thresh $_{BackhRateDLWLAN, High}$ | This specifies the backhaul available downlink bandwidth threshold used by the UE for traffic steering from E-UTRAN to WLAN |
| 8 | Thresh $_{BackhRateULWLAN, Low}$ | This specifies the backhaul available uplink bandwidth threshold used by the UE for traffic steering from WLAN to E-UTRAN |
| 9 | Thresh $_{BackhRateULWLAN, High}$ | This specifies the backhaul available uplink bandwidth threshold used by the UE for traffic steering from E-UTRAN to WLAN |
| 10 | Thresh $_{BeaconRSSIWLAN, Low}$ | This specifies the Beacon RSSI threshold used by the UE for traffic steering from WLAN to E-UTRAN |
| 11 | Thresh $_{BeaconRSSIWLAN, High}$ | This specifies the Beacon RSSI threshold used by the UE for traffic steering from E-UTRAN to WLAN |
| 12 | Tsteering $_{WLAN}$ | This specifies the timer value TsteeringWLAN during which the rules should be fulfilled before starting traffic steering between E-UTRAN and WLAN |
| 13 | WLAN identifiers | Only the SSIDs, BSSIDs and HESSIDs which are provided in this parameter shall be considered for traffic steering between E-UTRAN and WLAN based on the rules |

FIG. 9

| COMMAND | POSSIBLE RESPONSE(S) |
|---|---|
| +CIWRMATCH=[<n>]<br>(SET) | |
| +CIWRMATCH?<br>(READ) | +CIWRMATCH: <n>,<rscp>,<ecno>,<rsrp>,<rsrq> |
| +CIWRMATCH=?<br>(TEST) | +CIWRMATCH: (list of supported <n>s),(list of supported <rscp>s),(list of supported <ecno>s),(list of supported <rsrp>s),(list of supported <rsrq>s) |

| Command | Possible response(s) |
|---|---|
| +CIWRMATCH? (option e1) | +CIWRMATCH: <match> |
| +CIWRMATCH? (option e2) | +CIWRMATCH: <match>,(list of <Threshold>s) |
| +CIWRMATCH? (option e3) | +CIWRMATCH: <match>, (list of <Threshold>s, <RAN measurement>) |

FIG. 14

| Command | Possible response(s) |
|---|---|
| +CIWRMATCH? (option f1) | +CIWRMATCH: <match> |
| +CIWRMATCH? (option f2) | +CIWRMATCH: <match>,(match condition) |
| +CIWRMATCH? (option f3) | +CIWRMATCH: <match>, (match condition, <RAN measurement>) |

FIG. 15

| COMMAND | POSSIBLE RESPONSE(S) |
|---|---|
| +CGCONTRDP[=<cid>] READ | [+CGCONTRDP: <cid>,<bearer_id>,<apn>[,<local_addr and subnet_mask>[,<gw_addr>[,<DNS_prim_addr>[,<DNS_sec_addr>[,<P-CSCF_prim_addr>[,<P-CSCF_sec_addr>[,<IM_CN_Signalling_Flag>[,<LIPA_indication>[,<IPv4_MTU>[,<WLAN_Offload>]]]]]]]]]]<br><br>[<CR><LF>+CGCONTRDP: <cid>,<bearer_id>,<apn>[,<local_addr and subnet_mask>[,<gw_addr>[,<DNS_prim_addr>[,<DNS_sec_addr>[,<P-CSCF_prim_addr>[,<P-CSCF_sec_addr>[,<IM_CN_Signalling_Flag>[,<LIPA_indication>[,<IPv4_MTU>[,<WLAN_Offload>]]]]]]]]]]<br><br>[...]] |
| +CGCONTRDP=? TEST | +CGCONTRDP: (list of <cid>s associated with active contexts) |

FIG. 20

| COMMAND | POSSIBLE RESPONSE(S) |
|---|---|
| +CGSCONTRDP[=<cid>] READ | [+CGSCONTRDP: <cid>,<p_cid>,<bearer_id>[,<IM_CN_Signalling_Flag>[,<WLAN_Offload>]]]<br><br>[<CR><LF>+CGSCONTRDP: <cid>,<p_cid>,<bearer_id>[,<IM_CN_Signalling_Flag>[,<WLAN_Offload>]]<br><br>[...]] |
| +CGSCONTRDP=? TEST | +CGSCONTRDP: (list of <cid>s associated with active contexts) |

FIG. 21

OFFLOADABILITY OF PDN CONNECTION FOR LTE-WLAN INTERWORKING CONTROL AND MANAGEMENT

CROSS REFERENCE TO RELATED APPLICATIONS

This application claims priority under 35 U.S.C. § 119 from U.S. Provisional Application No. 62/108,630, entitled "LTE-WLAN Interworking Control and Management," filed on Jan. 28, 2015, the subject matter of which is incorporated herein by reference.

TECHNICAL FIELD

The disclosed embodiments relate generally to wireless communication, and, more particularly, to method for controlling and managing LTE-WLAN interworking using AT commands.

BACKGROUND

The wireless cellular communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). The $3^{rd}$ generation partner project (3GPP) network normally includes a hybrid of 2G/3G/4G systems. With the optimization of the network design, many improvements have developed over various standards, especially in providing wireless IP services via an Evolved Packet System (EPS).

After 3GPP introduces LTE-WLAN interworking, a network selection module sit in user equipment (UE) application processor (AP) side will need to know the assistance parameters and threshold values provided by the network. The network selection module is for UE to camp or transmit data in a better radio access network (RAN). For example, a better RAN may include a RAN that can provide higher throughput or less battery consumption from UE perspective.

The EPS/IP bearer and connection management and allocation functionality can be provided towards the applications and the terminal devices using an Application Programming interface (API). For external applications, the EPS/IP bearer and connection management and allocation functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA).

From MT perspective, it is desirable for MT to report the change of RAN assistance parameters for WLAN interworking, and to report the change of a "match" of a RAN assistance rule or condition. From TE perspective, it is desirable for TE to enable or disable MT reporting, to query one or more than one of the RAN assistance parameters and its given threshold value, and to query the offloadability of the PDN connections.

SUMMARY

Methods for LTE-WLAN interworking control and management are proposed. In a first novel aspect, a mobile termination (MT) can use an AT command to report radio access network (RAN) assistance parameters of the current serving cell. A terminal equipment (TE) can use the AT command to query the specific RAN assistance parameters and the threshold value provided by the network for making LTE-WLAN interworking decisions. If reporting is enabled by TE, then an unsolicited result code (URC) is sent from MT to TE whenever changes in the current RAN assistance parameters occur.

In a second novel aspect, a mobile termination (MT) can use an AT command to report the change of a RAN rule and/or a RAN condition match. A terminal equipment (TE) can use the AT command to query a list of matches and current RAN measurement values. A RAN rule match means one or more than one of RAN rules satisfy the threshold provided by the network according to TS36.304 description, or change from satisfied to unsatisfied. A RAN condition match means all RAN rules within a RAN condition are all satisfied according to TS36.604 description, or if any of the RAN condition change from satisfied to unsatisfied. If the reporting is enabled by TE, an unsolicited result code (URC) is sent from MT to TE whenever changes in the current RAN rule or RAN condition match occur.

In a third novel aspect, a terminal equipment (TE) can use an AT command to query the WLAN offloadability of a packet data network (PDN) connection. A mobile termination (MT) can store the WLAN offloadability indication in its memory and return the value to TE upon receiving the AT command. In one example, a new field <WLAN_Offload> can be added to an existing AT command.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 5 illustrates one embodiment of an AT command +CIWREP for setting/reading/testing a list of WLAN offload assistance parameters in accordance with one novel aspect.

FIG. 6 illustrates another embodiment of an AT command +CIWREP for controlling and reporting a list of WLAN offload assistance parameters in accordance with one novel aspect.

FIG. 9 illustrates one example of RAN assistance parameter reporting using a mapping table.

FIG. 14 illustrates another embodiment of an AT command +CIWRMATCH for RAN rule match reporting in accordance with one novel aspect.

FIG. 15 illustrates another embodiment of an AT command +CIWRMATCH for RAN condition match reporting in accordance with one novel aspect.

FIG. 20 illustrates one embodiment of an AT command +CGCONTRDP for offloadability of PDN connection in accordance with one novel aspect.

FIG. 21 illustrates another embodiment of an AT command +CGSCONTRDP for offloadability of PDN connection in accordance with one novel aspect.

DETAILED DESCRIPTION

Reference will now be made in detail to some embodiments of the invention, examples of which are illustrated in the accompanying drawings.

Figure 1:
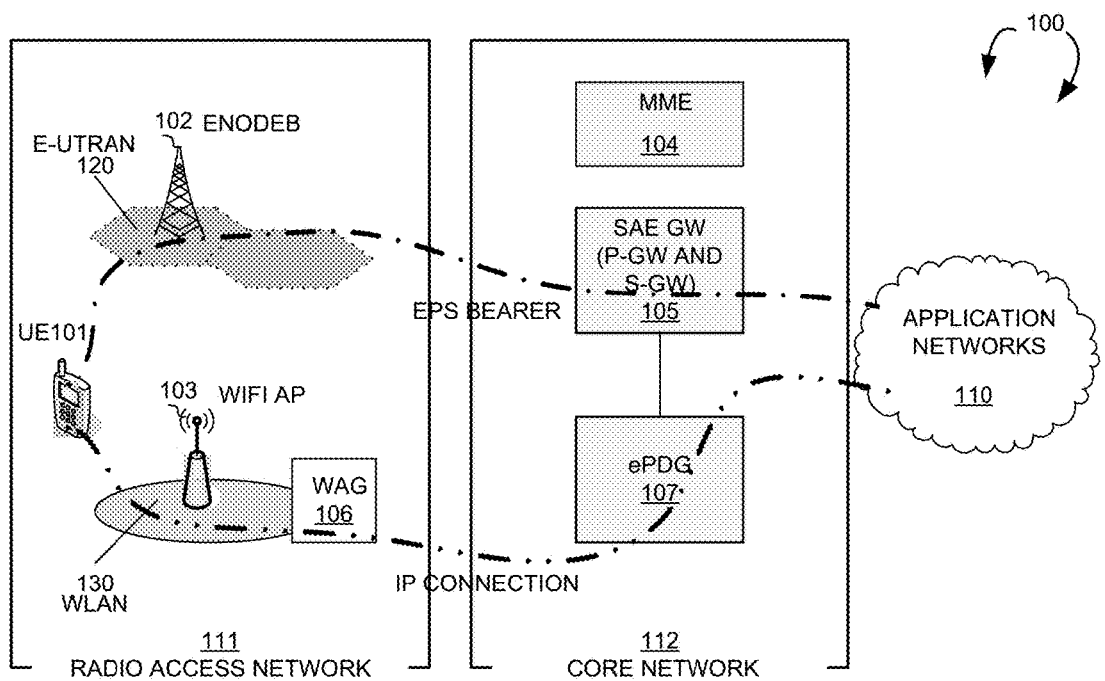
FIG. 1 illustrates an exemplary 3GPP wireless network with LTE-WLAN interworking for a user equipment (UE) in accordance with one novel aspect.

FIG. 1 illustrates an exemplary 3GPP wireless network 100 with LTE-WLAN interworking for a user equipment (UE) in accordance with one novel aspect. 3GPP network 100 is a Public Land Mobile Network (PLMN) or an Equivalent Public Land Mobile Network (EPLMN) that supports one or more wireless radio access technology (RAT) systems, such a 4G/LTE system, a 3G system, and a wireless local area network (WLAN). Each of the 3GPP system has a fixed base infrastructure unit, such as wireless communications stations 102 and 103, forming wireless networks distributed over a geographical region. The base unit may also be referred to as an access point, an access terminal, a base station, a NodeB, an eNodeB, or by other terminology used in the art. Each of the wireless communications stations 102 and 103 serves a geographic area. A 4G/LTE cellular system has an evolved node-B (eNodeB) 102 connecting with a system architecture evolution (SAE) gateway 105, which includes the serving gateway (S-GW) and the packet data network (PDN) gateway (P-GW). A WLAN system has a Wi-Fi AP 103 and a wireless access gateway (WAG) 106. WAG 106 connects with an evolved PDN gateway (ePDG) 107, which is connected to SAE gateway 105.

A wireless communications device/user equipment (UE) 101 in 3GPP system 100 can be served by eNodeB 102 or by AP 103 of the radio access network (RAN) 111 to access application networks or the Internet 110 through core network 112. RAN 111 can be an E-UTRAN 120 or WLAN 130. UE 101 establishes a bearer with 3GPP system 100 for data services. UE 101 establishes EPS bearer in the 4G system via E-UTRAN 120, or establishes an IP/PDN connection in the WLAN system via WLAN 130. For IP networks, the EPS bearer or PDP context is also referred to as a PDN or IP connection. In the example of FIG. 1, to establish an EPS bearer in the 4G system, UE 101 sends a PDN connectivity request to eNodeB 102.

When a UE is camped on an E-UTRAN or E-UTRA cell, or when the UE is searching for a cell to camp on, the UE follows RRC_Idle Mode procedure as defined by 3GPP TS 36.304, which also defines RAN-assisted LTE-WLAN interworking under section 5.6. RAN-assisted LTE-WLAN interworking is also supported for UE in RRC_Connected mode. In general, RAN assistance parameters for LTE-WLAN interworking may be provided to the UE in system information block (SIB) or via radio resource control (RRC) signaling. Further, the EPS/IP bearer and connection management and allocation functionality can be provided towards the applications and the terminal devices using an Application Programming interface (API) based on Packet Data Protocol (PDP) contexts.

For external applications, the EPS/IP bearer and connection management and allocation functionality may be provided through an AT command API in accordance with 3GPP TS 27.007 "AT command set for User Equipment (UE)". AT commands are used for controlling Mobile Termination (MT) functions and GSM/UMTS network services from a Terminal Equipment (TE) through Terminal Adaptor (TA). In accordance with one novel aspect, AT commands can be used by TE for controlling the reporting of RAN assistance parameters from MT for WLAN interworking. In the example of FIG. 1, UE 101 comprises a TE, a TA, and an MT. From MT perspective, MT can use AT commands to report the change of RAN assistance parameters for WLAN interworking, and to report the change of a "match" of a RAN assistance rule or condition. From TE perspective, TE can use AT commands to enable or disable MT reporting, to query one or more than one of the RAN assistance parameters and its given threshold value, and to query the offloadability of the PDN connections.

Figure 2:
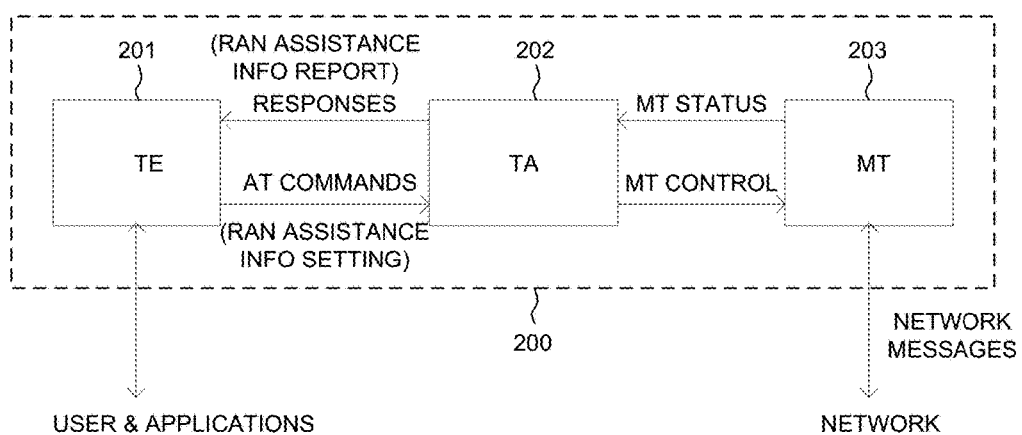
FIG. 2 illustrates a simplified block diagram of an architecture comprising a Terminal Equipment (TE) and a Mobile Termination (MT) interfaced by a Terminal Adaptor (TA) in accordance with one novel aspect.

FIG. 2 illustrates a simplified block diagram of an architecture of a user equipment UE 200 comprising a Terminal Equipment (TE 201) and a Mobile Termination (MT 203) interfaced by a Terminal Adaptor (TA 202) in accordance with one novel aspect. 3GPP TS 27.007 defines a plurality of AT commands for controlling MT functions and GPRS packet domain services based on PDP contexts. Each AT command includes a Context Identification (CID) parameter as reference to the specific PDP context (and the associated Radio Access Bearer (RAB)) to which the AT command applies. Further, AT commands are used by the TE to control the reporting of RAN assistance parameters for WLAN interworking. The TA, MT and TE may be implemented in the form of separate or integrated entities as needed. The span of control of the defined AT commands allows handing of any physical implementation that may lead to: TA, MT and TE as three separate entities; TA integrated under the MT cover, and TE implemented as a separate entity; TA integrated under the TE cover, and MT implemented as a separate entity; and TA and MT integrated under the TE cover as a single entity.

In the example of FIG. 2, the AT commands are observed on the link between TE 201 and TA 202. However, most of the AT commands exchange information about the MT, not about the TA. The Interface between TE 201 and TA 202 operates over existing serial cables, infrared link, and all link types with similar behavior. The interface between TA 202 and MT 203 is dependent on the interference within MT 203. In one embodiment, TE 201 sends an AT command to TA 202, which converts to an MT control to be sent to MT 203. The AT commands can be a read command for RAN assistance parameters from MT 203, or a set command for enabling/disabling MT reporting. In response, MT 203 sends an MT status back to TA 202, which converts to a response to be sent to TE 201. The response includes RAN assistance parameters for WLAN interworking.

Figure 3:
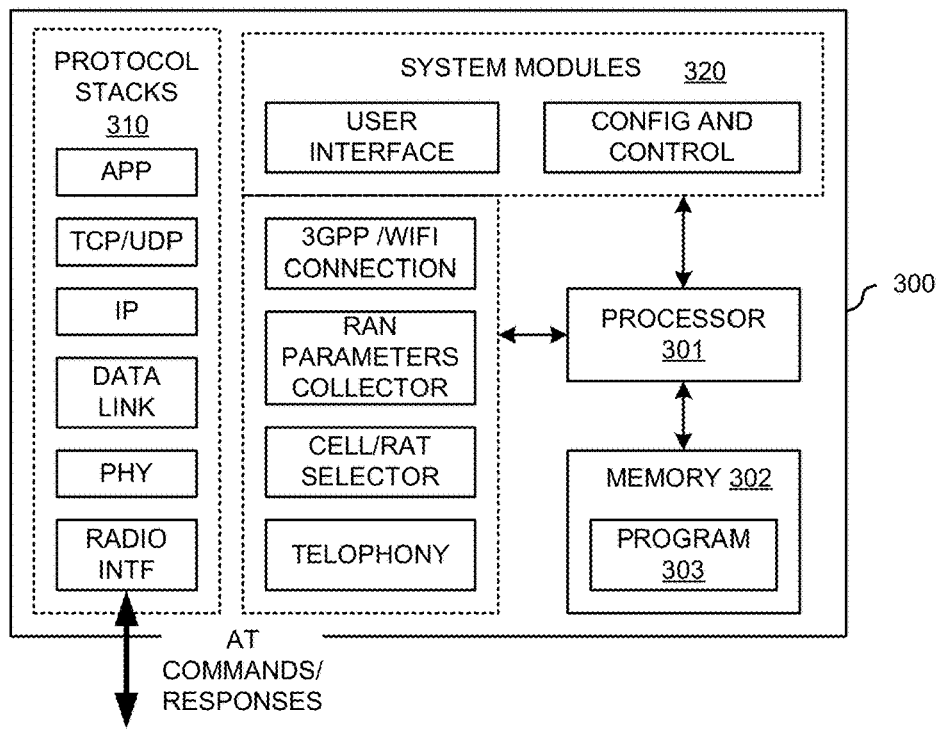
FIG. 3 illustrates a simplified block diagram of a Terminal Equipment (TE) in accordance with embodiments of the current invention.

FIG. 3 illustrates a simplified block diagram of a Terminal Equipment (TE 300) in accordance with embodiments of the current invention. TE 300 comprises a processor 301, memory 302, and protocol stacks 310 including Application (APP) layer, Transport (TCP/UDP) layer, Network (IP) layer, Data Link layer, and Physical (PHY) layer. TE 300 further comprises system control modules 320 including a user interface, a configuration and control module, a 3GPP connection handler, a WLAN connection handler, a RAN parameter collector, and a cell/RAT selector. Processor 301 processes different applications and invokes different system control modules to perform various features of TE 300. Memory 302 stores program instructions and data 303 to control the operations of TE 300. The system control modules are circuits that can be implemented and configured to carry out functional tasks of TE 300.

For IP data service, TE 300 first searches for cells to camp on and then camps on a selected cell. For 3GPP system supporting multiple RATs, TE 300 needs to perform cell selection over different RATs based on RAN offloading thresholds and the current RAN measurements. Based on the cell selection result, TE 300 steers application traffic to a better RAN. The above functionalities are handled by the 3GPP and WLAN connection handler, the RAN parameter collector, the cell/RAT selector, together with the protocol stacks 310. Typically, TE 300 is also equipped with telephony framework (e.g., dialer, call manager etc.) to support voice call functionality. In addition, TE 300 also supports AT commands as defined by 3GPP TS 27.007 for controlling MT functions and WLAN interworking based on PDP contexts and RAN assistance parameters. For example, TE 300 is equipped with a radio interface layer (RIL), which performs the main function to communicate with various modems through AT commands.

Figure 4:
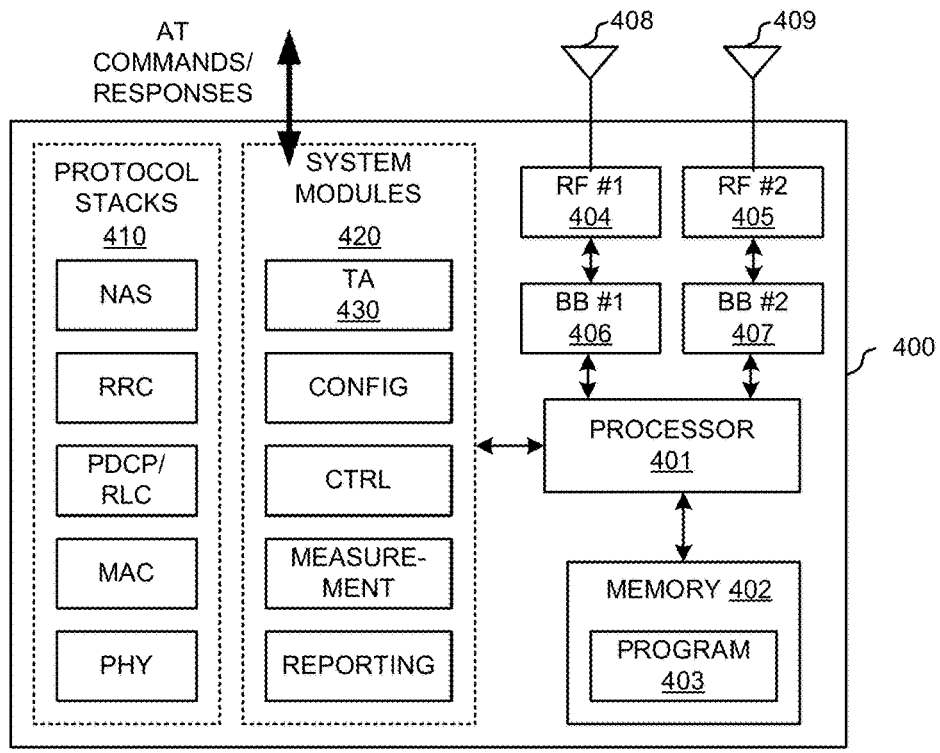
FIG. 4 illustrates a simplified block diagram of a Mobile Termination (MT) in accordance with embodiments of the current invention.

FIG. 4 illustrates a simplified block diagram of a Mobile Termination (MT 400) in accordance with embodiments of the current invention. MT 400 has multiple RF chains supporting multiple RATs. Each RF chain includes an antenna 406/409, an RF transceiver RF 404/405, and a baseband processor BB 406/407. For example, RF#1 and BB#1 are for 3GPP cellular radio signals, while RF#2 and BB#2 are for WLAN radio signals. The antennas transmit and receives radio signals. The RF transceivers, coupled with the antenna, receive RF signals from antenna 406, convert them to baseband signals and send them to processor 401 via the baseband processors. The RF transceivers also convert received baseband signals from processor 401 via the baseband processors, convert them to RF signals, and send out to the antennas. Processor 401 processes the received baseband signals and invokes different functional modules and circuits to perform features in MT 400. Memory 402 stores program instructions and data 403 to control the operations of MT 400.

MT 400 also comprises a set of protocol stacks 410 and control circuits including various system modules 420 to carry out functional tasks of MT 400. Protocol stacks 410 comprises Non-Access-Stratum (NAS) layer, Radio Resource Control (RRC) layer, Packet Data Convergence Protocol/Radio Link Control (PDCP/RLC) layer, Media Access Control (MAC) layer, and Physical (PHY) layer. System modules 420 comprises a configuration module, a control module, a measurement module, and a reporting module for reporting RAN assistance thresholds and RAN measurements. In the example of FIG. 4, MT 400 further comprises a Terminal Adaptor (TA 430) that receives and transmits AT commands and converts the AT commands to be processed by processor 401 for controlling MT functions. In one example, TA 430 receives an AT read command from a TE for the MT to report RAN assistance information for WLAN interworking. In another example, TA 430 receives an AT read command from a TE for the MT to report the change of a match of the RAN rules or RAN conditions for WLAN interworking. In yet another example, TA 430 receives an AT read command from a TE for the MT to report offloadability of PDN connections.

RAN Assistance Parameter Reporting

In a first novel aspect, a mobile termination (MT) can use an AT command to report radio access network (RAN) assistance parameters of the current serving cell. A terminal equipment (TE) can use the AT command to query the specific RAN assistance parameters and the threshold value provided by the network for making LTE-WLAN interworking decisions. If reporting is enabled by TE, then an unsolicited result code (URC) is sent from MT to TE whenever changes in the current RAN assistance parameters occur. For example, when MT receives initial access of system information or detects system information change, when MT receives radio resource control (RRC) signaling for RAN assistance parameters, or when MT detects UE moving to a new cell with different RAN assistance information, then MT can send URC to TE with the updated RAN assistance parameters.

FIG. 5 illustrates one embodiment of an AT command +CIWREP for setting/reading/testing a list of WLAN offload assistance parameters in accordance with one novel aspect. As illustrated in FIG. 5, the +CIWREP command is a set or read or test command. The set command enables or disables the WLAN offload assistance data reporting. If reporting is enabled by <n>=1, the MT returns unsolicited result code (URC) from MT to TE whenever the WLAN offload assistance data changes at the MT. The read command returns the WLAN offload assistance data currently available at the MT. The test command returns the values supported by MT as compound values.

The defined values of the relevant WLAN offload assistance data include: <n>: integer, 0 for disabling WLAN offload assistance data URC, 1 for enabling WLAN offload assistance data URC; <threshRSCPLow>: indicates the threshold for received signal code power for offloading traffic from UTRAN to WLAN; <threshRSCPHigh>: indicates the threshold for received signal code power for offloading traffic from WLAN to UTRAN; <threshEcnoLow>: indicates the threshold for ratio of the received energy per PN chip to the total received power spectral density for offloading traffic from UTRAN to WLAN; <threshEcnoHigh>: indicates the threshold for ratio of the received energy per PN chip to the total received power spectral density for offloading traffic from WLAN to UTRAN; <threshRSRPLow>: indicates the threshold for reference signal received power for offloading traffic from EUTRAN to WLAN; <threshRSRPHigh>: indicates the threshold for reference signal received power for offloading traffic from WLAN to EUTRAN; <threshRSRQLow>: indicates the threshold for reference signal received quality for offloading traffic from EUTRAN to WLAN; <threshRSRQHigh>: indicates the threshold for reference signal received quality for offloading traffic from WLAN to EUTRAN; <threshChUtilLow>: indicates the low threshold value of WLAN channel utilization (BSS load); <threshChUtilHigh>: indicates the high threshold value of WLAN channel utilization (BSS load); <threshBackhRateDLLow>: indicates the low threshold of backhaul available downlink bandwidth for traffic offloading to UTRAN or to E-UTRAN; <threshBackhRateDLHigh>: indicates the high threshold of backhaul available downlink bandwidth for traffic offloading to WLAN; <threshBackhRateULLow>: indicates the low threshold of backhaul available uplink bandwidth for traffic offloading to UTRAN or to E-UTRAN; <threshBackhRateULHigh>: indicates the high threshold of backhaul available uplink bandwidth for traffic offloading to WLAN; <threshBeaconRSSILow>: indicates the low threshold value of beacon RSSI used for traffic offloading to UTRAN or E-UTRAN; <threshBeaconRSSIHigh>: indicates the high threshold value of beacon RSSI used for traffic offloading to WLAN; <opi>: a 16-bit integer formatted as a bitmap that specifies the offload preference indicator; <tSteering>: indicates the timer value in seconds during which the rules should be fulfilled before starting traffic offloading between E-UTRAN and WLAN; <WLANIdentifierListLength>: indicates the number of entries in WLAN identifier list which is a tuple consisting of the <ssid>, <bssid>, and <hessid> identifiers.

FIG. 6 illustrates another embodiment of an AT command +CIWREP for controlling and reporting a list of WLAN offload assistance parameters in accordance with one novel aspect. As illustrated in FIG. 6, the +CIWREP command is a set or read or test command. The set command enables or disables the WLAN offload assistance data reporting. The read command returns the WLAN offload assistance data currently available at the MT. The test command returns a list of supported reporting. The read command has two options b1 and b2. For option b1, the read command returns a list of WLAN offloading thresholds. For option b2, the read command returns a list of WLAN offloading thresholds, as well as a list of current RAN measurement values.

Figure 7:
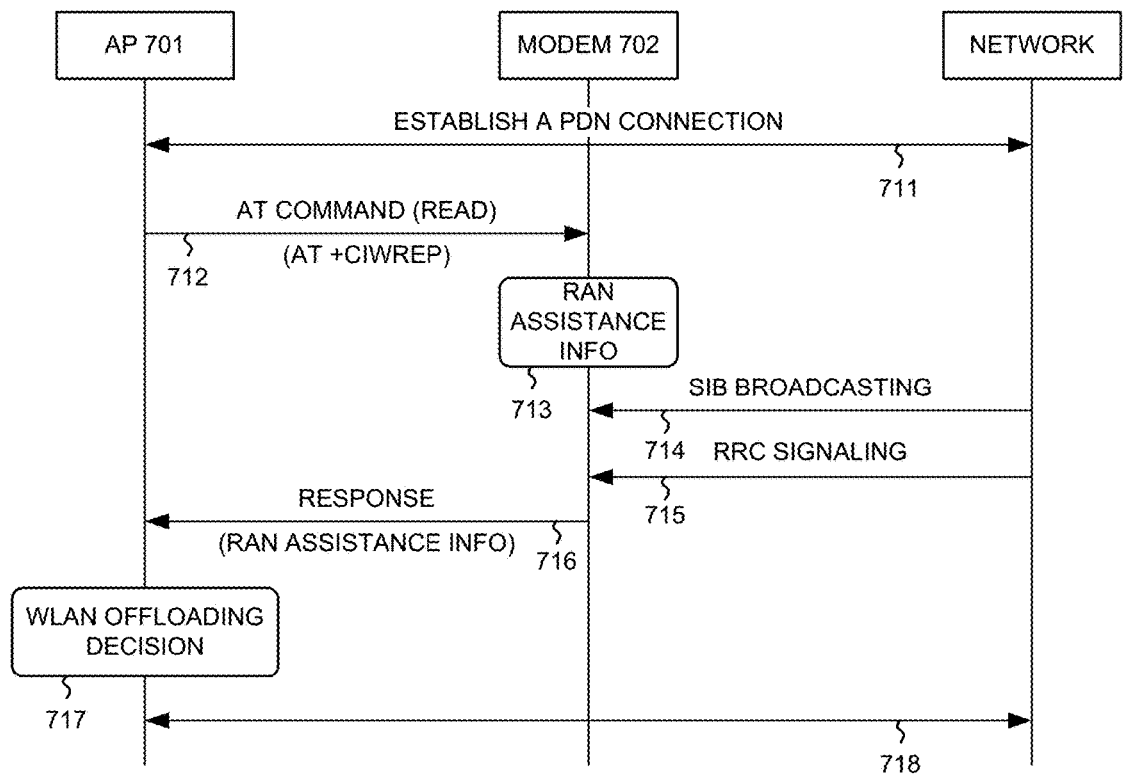
FIG. 7 illustrates a message flow between a TE and an MT for querying and reporting WLAN offload assistance information.

FIG. 7 illustrates a message flow between a TE 701 and an MT 702 for querying and reporting WLAN offload assistance information. TE 701 is also referred to as an Application Processor (AP), while MT 702 is also referred to as a Modulator/Demodulator (modem). In step 711, AP 701 attaches to the LTE network and establishes a PDN connection with the network through LTE or WLAN. In step 712, the AP sends an AT read command +CIWREP for retrieving a list of RAN assistance parameters. In step 713, modem 702 obtains RAN assistance information, which is typically available at the modem already. In one example, the modem receives the RAN assistance information via SIB broadcasted by the serving base station (in step 714) in RRC Idle mode. In another example, the modem receives the RAN assistance information via RRC signaling (in step 715) in RRC connected mode. Note that step 712 may occur after steps 713 to 715. In step 716, the modem sends a response back to the AP, which includes the RAN assistance information. In step 717, the AP steers data traffic to a preferred RAT based on the received RAN assistance information.

Figure 8:
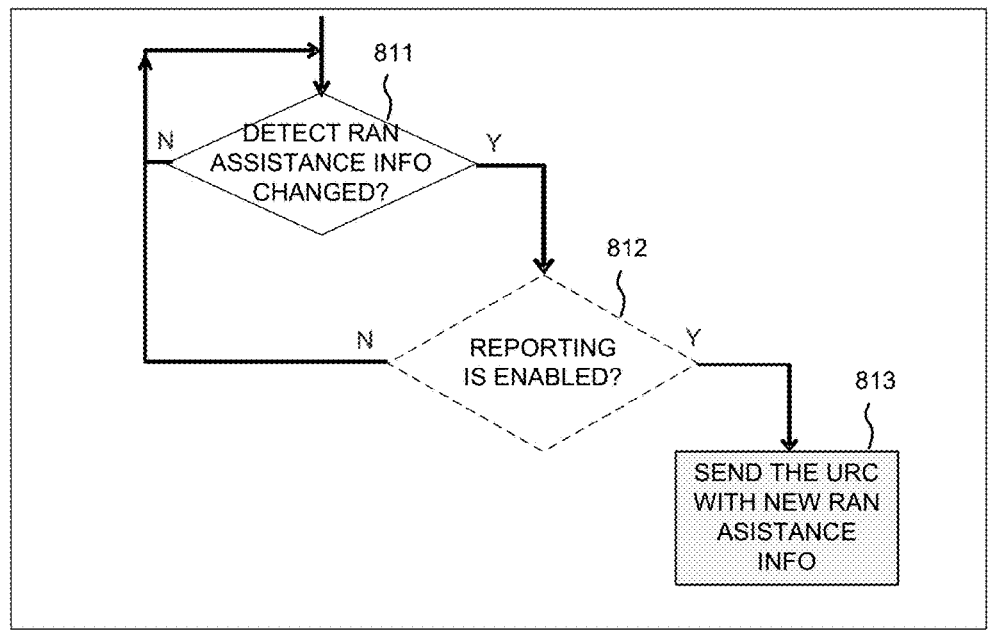
FIG. 8 illustrates a mechanism of reporting WLAN offload assistance information by an MT using Unsolicited Request Code (URC).

FIG. 8 illustrates a mechanism of reporting WLAN offload assistance information by an MT using Unsolicited Request Code (URC). For normal communication between TE and MT, TE will issue AT commands and MT will respond to the AT commands. URC is an exception. URC indicates the occurrence of an event not directly associated with issuance of any AT command from TE. Under URC, MT will actively report predefined events without any AT command from TE. As illustrated in FIG. 8, in step 811, the MT detects whether RAN assistance parameters have changed. In step 812, the MT checks whether MT reporting is enabled or disabled. In step 813, if MT reporting is enabled, then the MT sends URC with the newly updated RAN assistance parameters to the TE. Note that step 812 is optional and may be omitted.

FIG. 9 illustrates one example of RAN assistance parameter reporting using a mapping table. Several options can be used by the MT to display the RAN assistance parameters and the threshold values via URC. In a first option, the parameter list refers to an order in a table 900 to represent each parameters. For example, the first parameter in the URC means the parameter of index 0 in the table. MT uses integer type to represent the threshold values. For example, an entry in the mapping table −60,−10,,,,,,,,,,,"CMCC" means: Threshold (serving offload WLAN)_LowP=−60 dBm, Threshold (serving offload WLAN)_HighP=−10 dBm and WLAN identifier (SSID)="CMCC". In a second option, the MT uses string type to indicate the parameters, and uses integer type to represent the threshold value. For example, "+CIWREP:THQLOW,−10", or "+CIWREPTHQLOW:−10" both mean Threshold (serving offload WLAN)_LowP=−10 dBm. In a third option, the MT uses integer type to indicate the parameters, and uses integer type to represent the threshold value. For example, "+CIWREP:2,−60" or "CIWREP2:−60" both mean Threshold (serving offload WLAN)_LowQ=−60 dBm.

Figure 10:
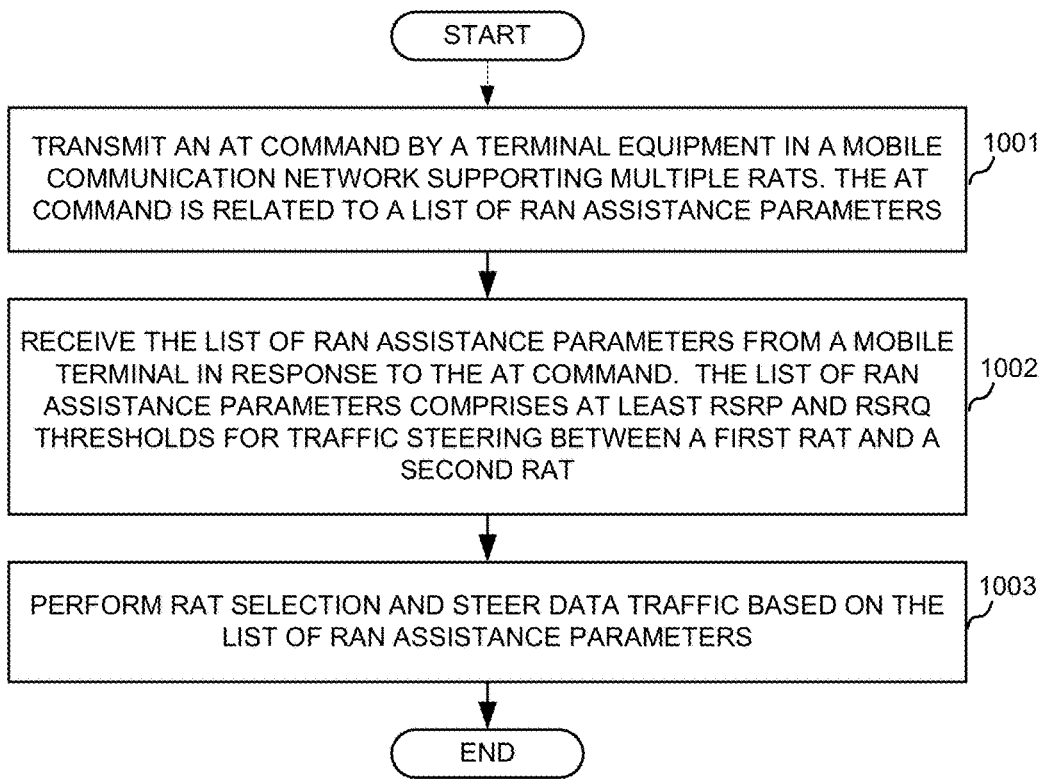
FIG. 10 is a flow chart of a method of controlling and reporting WLAN offload assistance parameters from TE perspective in accordance with one novel aspect.

FIG. 10 is a flow chart of a method of controlling and reporting WLAN offload assistance parameters from TE perspective in accordance with one novel aspect. In step 1001, a terminal equipment (TE) transmits an AT command in a mobile communication network supporting multiple RATs. The AT command is related to a list of RAN assistance parameters. In step 1002, the TE receives the list of RAN assistance parameters in response to the AT command. The list of RAN assistance parameters comprises at least RARP and RSRQ thresholds for traffic steering between a first RAT and a second RAT. In step 1003, the TE performs RAT selection and steers data traffic based on the list of RAN assistance parameters.

Figure 11:
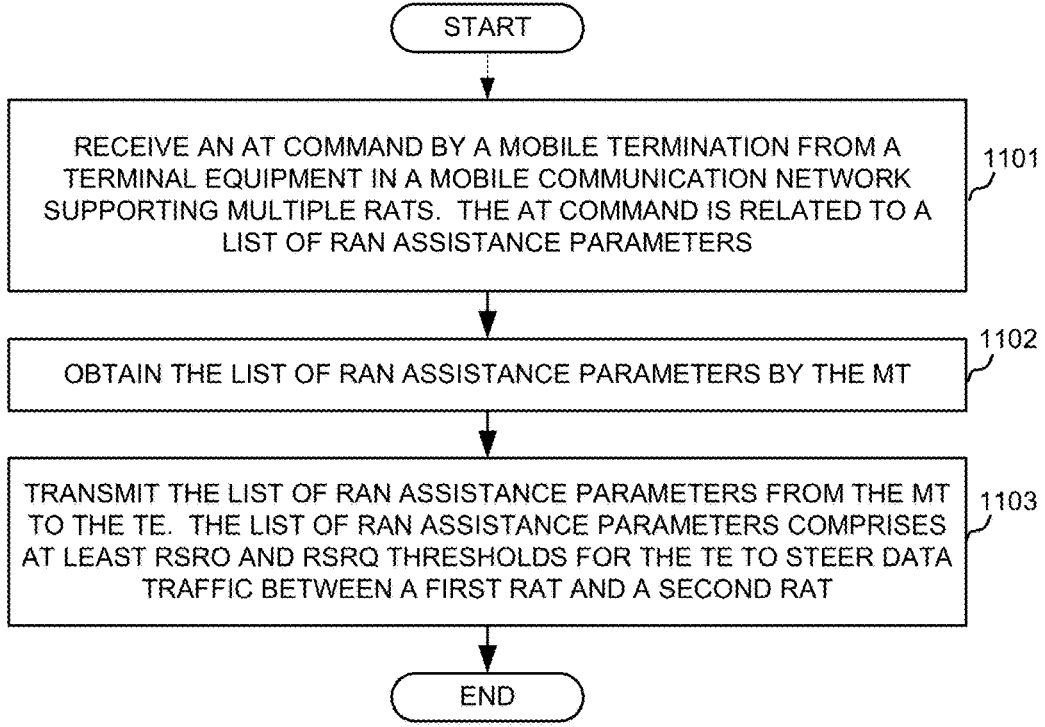
FIG. 11 is a flow chart of a method of controlling and reporting WLAN offload assistance parameters from MT perspective in accordance with one novel aspect.

FIG. 11 is a flow chart of a method of controlling and reporting WLAN offload assistance parameters from MT perspective in accordance with one novel aspect. In step 1101, a mobile termination (MT) receives an AT command from a terminal equipment (TE) in a mobile communication network supporting multiple RATs. The AT command is related to a list of RAN assistance parameters. In step 1102, the MT obtains the list of RAN assistance parameters. In step 1103, the MT transmits the list of RAN assistance parameters to the TE. The list of RAN assistance parameters comprises at least RARP and RARQ thresholds for the TE to steer data traffic between a first RAT and a second RAT.

RAN Rule/Condition Match Reporting

In a second novel aspect, a mobile termination (MT) can use an AT command to report the change of a RAN rule and/or a RAN condition match. A terminal equipment (TE) can use the AT command to query a list of matches and current RAN measurement values. A RAN rule match means one or more than one of RAN rules satisfy the threshold provided by the network according to TS36.304 description, or change from satisfied to unsatisfied. A RAN condition match means all RAN rules within a RAN condition are all satisfied according to TS36.604 description, or if any of the RAN condition change from satisfied to unsatisfied. If the reporting is enabled by TE, an unsolicited result code (URC) is sent from MT to TE whenever changes in the current RAN rule or RAN condition match occur.

Figures 12, 13:
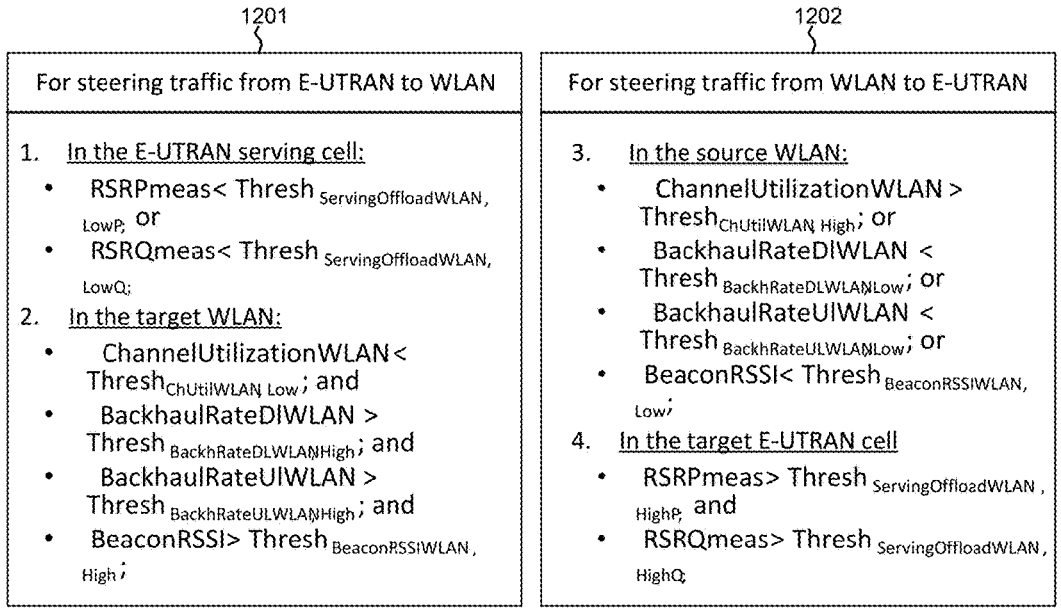
FIG. 12 illustrates different RAN rules and conditions for steering traffic from E-UTRAN to WLAN and from WLAN to E-UTRAN.
FIG. 13 illustrates one embodiment of an AT command +CIWRMATCH for setting/reading/testing a list of matches of RAN Rule/Condition in accordance with one novel aspect.

FIG. 12 illustrates different RAN rules and conditions for steering traffic from E-UTRAN to WLAN and from WLAN to E-UTRAN based on 3GPP TS36.304. The upper layers in the UE shall be notified when and for which WLANs that matches all the provided identifiers for a specific entry in the list, conditions 1 and 2 for steering traffic from E-UTRAN to WLAN are satisfied for a time interval $Tsteering_{WLAN}$. As depicted in table 1201, condition 1 comprises two rules, and is satisfied if either of the rules is satisfied. Condition 2 comprises four rules, and is satisfied only if all rules are satisfied. Similarly, the upper layers in the UE shall be notified when conditions 3 and 4 for steering traffic from WLAN to E-UTRAN as satisfied for a time interval $Tsteering_{WLAN}$. As depicted in table 1202, condition 3 comprises four rules, and is satisfied if any of the rules is satisfied. Condition 4 comprises two rules, and is satisfied only if both rules are satisfied.

FIG. 13 illustrates one embodiment of an AT command +CIWRMATCH for setting/reading/testing a list of matches of RAN Rule/Condition in accordance with one novel aspect. As illustrated in FIG. 13, the +CIWRMATCH command is a set or read or test command. The set command enables or disables the indication for WLAN offloading based on the thresholds for cell measurement parameters. If reporting is enabled by <n>=1, the MT returns URC from MT to TE whenever the cell measurement parameters meet the criteria for WLAN offloading based on configured thresholds. The read command returns the measurements from the current primary serving cell at the MT. The test command returns the values supported by MT as compound values.

The defined values of the relevant cell measurement parameters include <n>: integer, 0 for disabling WLAN offload cell measurement URC, 1 for enabling WLAN offload cell measurement URC; <rscp>: indicates the received signal code power reference parameter RSRP; <ecno>: indicates the ratio of the received energy per PN chip to the total received power spectral density; <rsrp>: indicates the reference signal received power; <rsrq>: indicates the reference signal received quality.

FIG. 14 illustrates another embodiment of an AT command +CIWRMATCH for RAN rule match reporting in accordance with one novel aspect. The +CIWRMATCH read command provides three different options for RAN rule match reporting. In option e1, the MT returns if changes on RAN rules match occurred. In option e2, the MT returns if changes on RAN rules match occurred and in addition will indicate which RAN rules are matched. In option e3, the MT returns if changes on RAN rules match occurred, which RAN rules are matched, and the current RAN measurement values (e.g., current RSRP value). If the information of the WLAN part could not be retrieved, "no information" code is reported.

FIG. 15 illustrates another embodiment of an AT command +CIWRMATCH for RAN condition match reporting in accordance with one novel aspect. The +CIWRMATCH read command provides three different options for RAN condition match reporting. In option f1, the MT returns if changes on a RAN condition match occurred. In option e2, the MT returns if changes on a RAN condition match occurred and in addition will indicate which RAN condition is matched. In option e3, the MT returns if changes on a RAN condition match occurred, which RAN condition is matched, and the current RAN measurement values (e.g., current RSRP value). If the information of the WLAN part could not be retrieved, "no information" code is reported.

Figure 16:
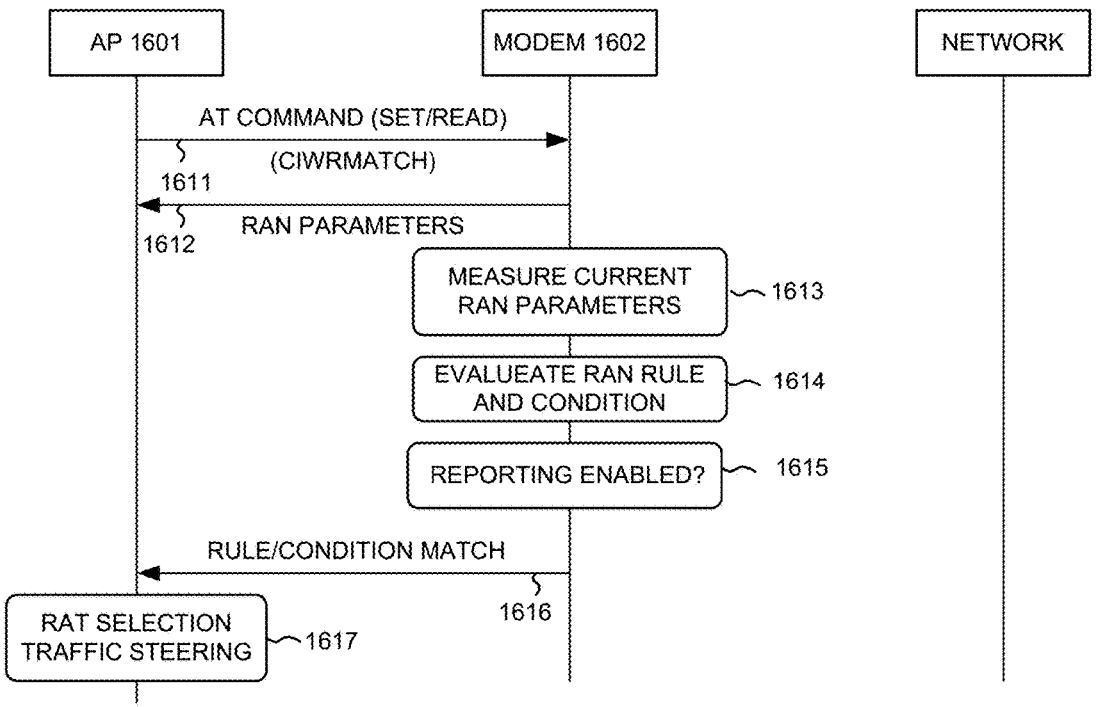
FIG. 16 illustrates a message flow between a TE and an MT for RAN Rule/Condition match reporting.

FIG. 16 illustrates a message flow between a TE 1601 and an MT 1602 for RAN Rule/Condition match reporting. TE 1601 is also referred to as an AP, while MT 1602 is also referred to as a modem. In step 1611, AP 1601 sends an AT command +CIWRMATCH to modem 1602. The AT command can be a read command or a set command. If the AT command is a read command for querying the RAN parameters, then the modem will report the cell measurement parameters immediately in step 1612. Otherwise, the AT command can be a set command for enabling or disabling the indication for WLAN offloading based on the thresholds for cell measurement parameters. The modem then returns URC to the AP whenever the cell measurement parameters meet the criteria for WLAN offloading based on configured thresholds. In step 1613, the modem measures current RAN parameters. In step 1614, the modem evaluates RAN rule and RAN condition match change based on the WLAN offloading criteria. In step 1615, the MT checks if URC reporting is enabled. If yes, then in step 1616, the modem sends the changes of RAN rule match or RAN condition match to the AP via URC. In step 1617, the AP performs RAT selection and traffic steering for application data traffic.

Figure 17:
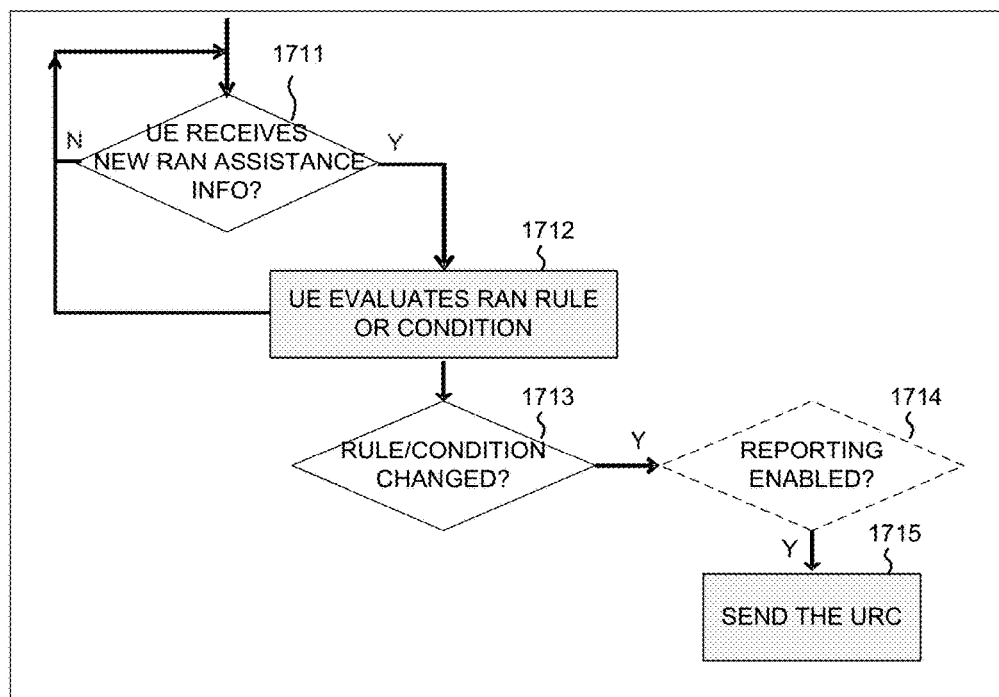
FIG. 17 illustrates a mechanism of reporting RAN Rule/Condition match by an MT using Unsolicited Request Code (URC).

FIG. 17 illustrates a mechanism of reporting RAN Rule/Condition match by an MT using Unsolicited Request Code (URC). In step 1711, the MT determines whether it receives new RAN assistance information. For example, new RAN assistance information may be received through SIB broadcasting or through RRC signaling. If the answer is yes, in step 1712, the MT evaluates RAN rule or RAN condition. In step 1713, the MT further evaluates whether a rule match or a condition match has changed. If the answer to step 1713 is yes, then in step 1714, the MT checks if URC reporting is enabled. If the answer is yes, then in step 1715, then the MT send the changes of RAN rule match or RAN condition match to a TE via URC. Note that step 1714 is optional.

Figure 18:
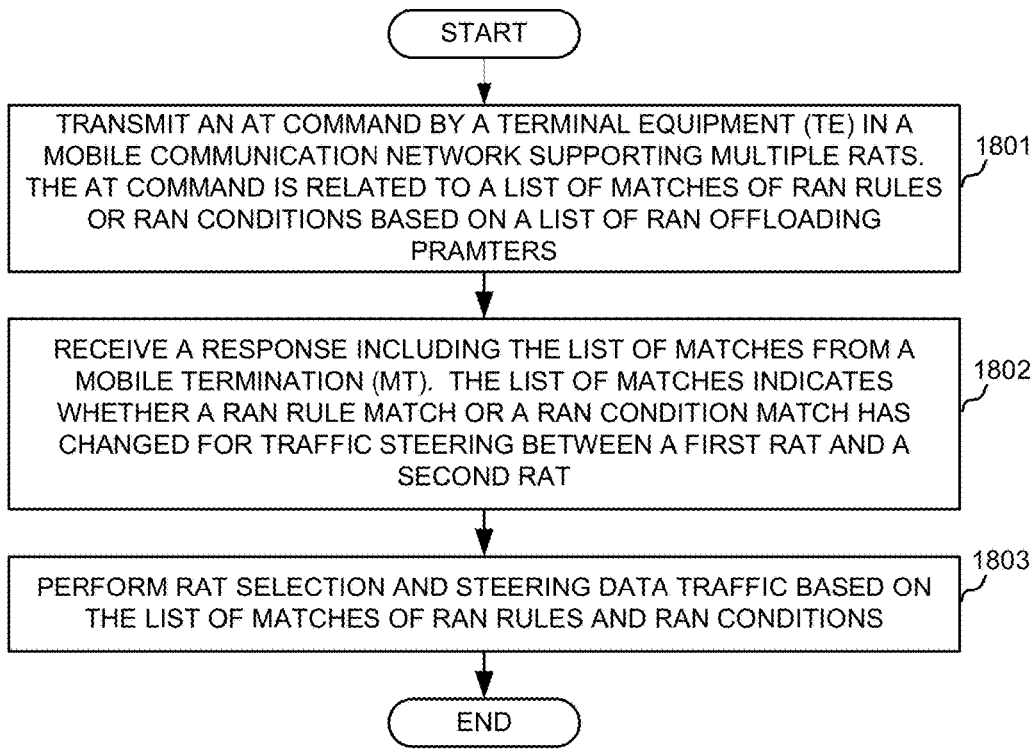
FIG. 18 is a flow chart of a method of controlling and reporting RAN Rule/Condition match from TE perspective in accordance with one novel aspect.

FIG. 18 is a flow chart of a method of controlling and reporting RAN Rule/Condition match from TE perspective in accordance with one novel aspect. In step 1801, a terminal equipment (TE) transmits an AT command in a mobile communication network supporting multiple RATs. The AT command is related to a list of matches of RAN rules or RAN conditions based on a list of RAN offloading parameters. In step 1802, the MT receives a response including the list of matches from a mobile termination (MT). The list of matches indicates whether a RAN rule match or a RAN condition match has changed match has changed for data traffic steering between a first RAT and a second RAT. In step 1803, the TE performs RAT selection and steers data traffic based on the list of matches of RAN rules and RAN conditions.

Figure 19:
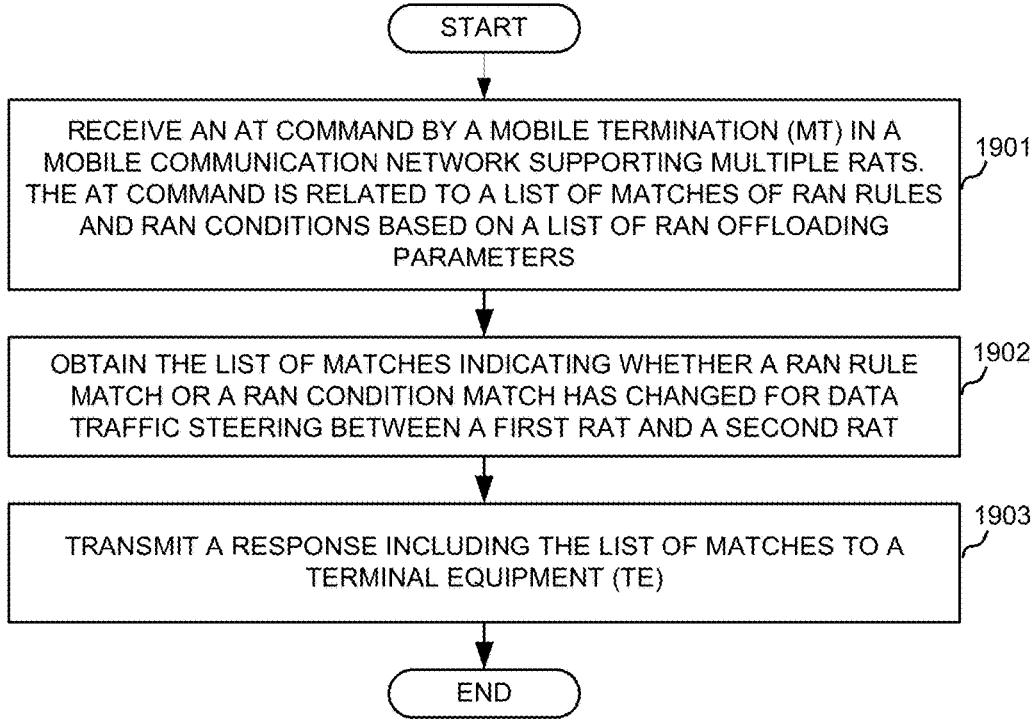
FIG. 19 is a flow chart of a method of controlling and reporting RAN Rule/Condition match from MT perspective in accordance with one novel aspect.

FIG. 19 is a flow chart of a method of controlling and reporting RAN Rule/Condition match from MT perspective in accordance with one novel aspect. In step 1901, a mobile termination (MT) receives an AT command in a mobile communication network supporting multiple RATs. The AT command is related to a list of matches of RAN rules and RAN conditions based on a list of RAN offloading parameters. In step 1902, the MT obtains the list of matches indicating whether a RAN rule match or a RAN condition match has changed for data traffic steering between a first RAT and a second RAT. In step 1903, the MT transmit a response including the list of matches to a terminal equipment (TE).

Offloadability of PDN Connection

For some PDN connections, it is not desirable that its data traffic can be offloaded to a WLAN. One reason is that WLAN may not be able to provide the same QoS as in E-UTRAN/UTRAN. Another reason is that certain applications cannot afford the service interruption due to the WLAN offload. As a result, for each PDN connection, the network can provide its corresponding offloadability to UE. In a third novel aspect, a terminal equipment (TE) can use an AT command to query the WLAN offloadability of a packet data network (PDN) connection. A mobile termination (MT) can store the WLAN offloadability indication in its memory and return the value to TE upon receiving the AT command. In one example, a new field <WLAN_Offload> can be added to an existing AT command.

FIG. 20 illustrates one embodiment of an AT command +CGCONTRDP for acquiring offloadability of PDN connection associated with a context identification (CID) in accordance with one novel aspect. As illustrated in FIG. 20, the +CGCONTRDP command is a read or test command. The execution of the read command returns the relevant information for an active non-secondary PDP context with the context identifier <cid>. If the parameter <cid> is omitted in the AT command, then the relevant information for all active non-secondary PDP contexts is returned. The execution of the test command returns a list of <cid>s associated with active non-secondary PDP contexts.

The defined values of the relevant information include: <cid>: a particular non-secondary PDP context identifier; <bearer-id>: identifiers the EPS bearer; <apn>: a logical name that was used to select the packet data network; <local_addr and subnet_mask>: shows the IP address and subnet mask of the MT; <gw_addr>: shows the Gateway Address of the MT; <DNS_prim_addr>: shows the IP address of the primary DNS server; <DNS_sec_addr>: shows the IP address of the secondary DNS server; <P_CSCF_prim_addr>: shows the IP address of the primary P-CSCF server; <P_CSCF_sec_addr>: shows the IP address of the secondary P-CSCF server; <IM_CN_Signaling_Flag>: shows whether the PDN context is for IM CN subsystem-related signaling only or not; <LIPA_indication>: indicates that the PDP context provides connectivity using LIPA PDN connection; <IPv4_MTU>: shows the IPv4 MTU size in octets; and <WLAN_Offload>: an integer that indicates whether traffic can be offloaded using the specified PDN connection via a WLAN or not. This refers to bits 1 and 2 of the WLAN offload acceptability IE: 0 indicates offloading the traffic of the PDN connection via a WLAN when in S1 mode or when in Iu mode is not acceptable; 1 indicates offloading the traffic of the PDN connection via a WLAN when in S1 mode is acceptable, but not acceptable in Iu mode; 2 indicates offloading the traffic of the PDN connection via a WLAN when in Iu mode is acceptable, but not acceptable in Si mode; 3 indicates offloading the traffic of the PDN connection via a WLAN when in S1 mode or when in Iu mode is acceptable. In an alternative embodiment, two independent fields, each with a single bit, are used to indicate WLAN offloadability for E-UTRAN (s1 mode) and for UTRAN (Iu mode) respectively.

FIG. 21 illustrates another embodiment of an AT command +CGSCONTRDP for offloadability of secondary PDN connection in accordance with one novel aspect. As illustrated in FIG. 21, the +CGSCONTRDP command is a read or test command. The execution of the read command returns <p_cid>, <bearer_id>, <IM_CN_Signaling_Flag>, and <WLAN_Offload> for an active secondary PDP context with the context identifier <cid>. If the parameter <cid> is omitted in the AT command, then the <cid>, <p_cid>, <bearer_id>, <IM_CN_Signaling_Flag>, and <WLAN_Offload> are returned for all active secondary PDP contexts. The test command returns a list of <cid>s associated with active secondary PDP contexts.

The defined values include: <cid>: specifies a particular active secondary PDP context or Traffic Flows definition; <p_cid>: specifies a particular PDP context definition or default EPS context identifier which has been specified by use of the +CGDCONT command; <bearer_id>: identifies the bearer; <IM_CN_Signaling Flag>: shows whether the PDP context is for IM CN subsystem-related signaling or not; <WLAN_Offload>: an integer that indicates whether traffic can be offloaded using the specified PDN connection via a WLAN or not. This refers to bits 1 and 2 of the WLAN offload acceptability IE.

Figure 22:
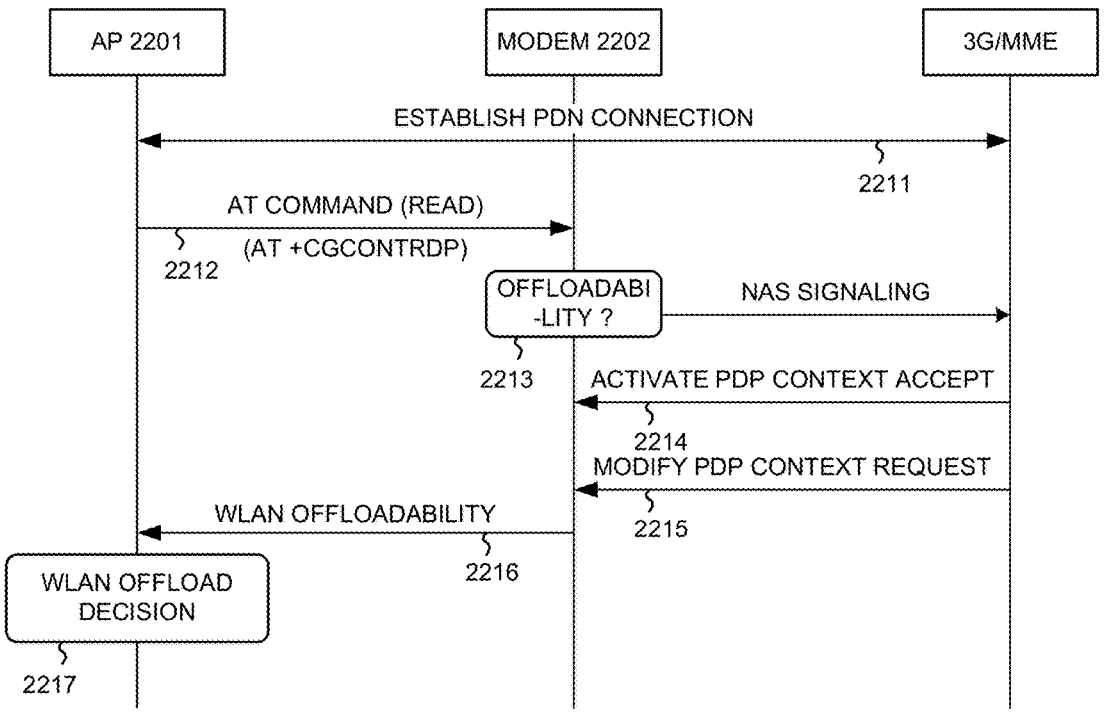
FIG. 22 illustrates a message flow between a TE and an MT for offloadability of PDN connection reporting in 3G systems.

FIG. 22 illustrates a message flow between a TE 2201 and an MT 2202 for offloadability of PDN connection reporting in 3G systems. TE 2201 is also referred to as an Application Processor (AP), while MT 2202 is also referred to as a Modulator/Demodulator (modem). In step 2211, AP 701 establishes a PDN connection with a CID in a 3G system. In step 2212, the AP sends an AT read command +CGCONTRDP for retrieving a list of PDP context parameters including WLAN offloadability of the PDN connection associated with the CID. In step 2213, modem 2202 obtains the PDP context information through NAS signaling with an MME. For example, the modem receives "Activate PDP context accept" (step 2214) or "Modify PDP context request" (step 2215) from the network. In an alternative embodiment, step 2212 occurs after steps 2213 to 2215, e.g., the offloadability information is available at the modem before the AT command. In step 2216, the modem sends a response back to the AP, which includes the PDP context information associated with the CID. In step 2217, the AP determines whether to offload data traffic of the PDN connection via a WLAN based on the WLAN offloadability.

Figure 23:
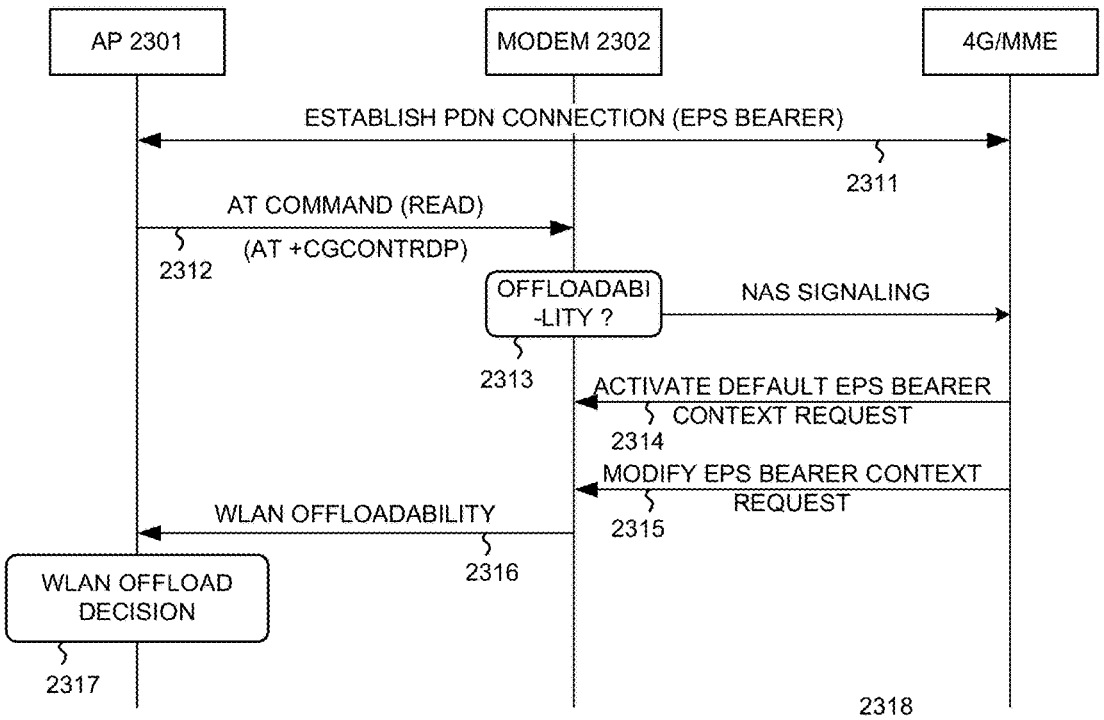
FIG. 23 illustrates a message flow between a TE and an MT for offloadability of PDN connection reporting in 4G systems.

FIG. 23 illustrates a message flow between a TE 2301 and an MT 2303 for offloadability of PDN connection reporting in 4G systems. TE 2301 is also referred to as an Application Processor (AP), while MT 2302 is also referred to as a Modulator/Demodulator (modem). In step 2311, AP 2301 establishes a PDN connection with a CID in a 4G system. In step 2312, the AP sends an AT read command +CGCONTRDP for retrieving a list of PDP context parameters including WLAN offloadability of the PDN connection associated with the CID. In step 2313, modem 2302 obtains the PDP context information through NAS signaling with an MME. For example, the modem receives "Activate default EPS bearer context request" (step 2314) or "Modify EPS bearer context" message (step 2315) from the network. In an alternative embodiment, step 2312 occurs after steps 2313 to 2315, e.g., the offloadability information is available at the modem before the AT command. In step 2316, the modem sends a response back to the AP, which includes the PDP context information associated with the CID. In step 2317, the AP determines whether to offload data traffic of the PDN connection via a WLAN based on the WLAN offloadability.

Figure 24:
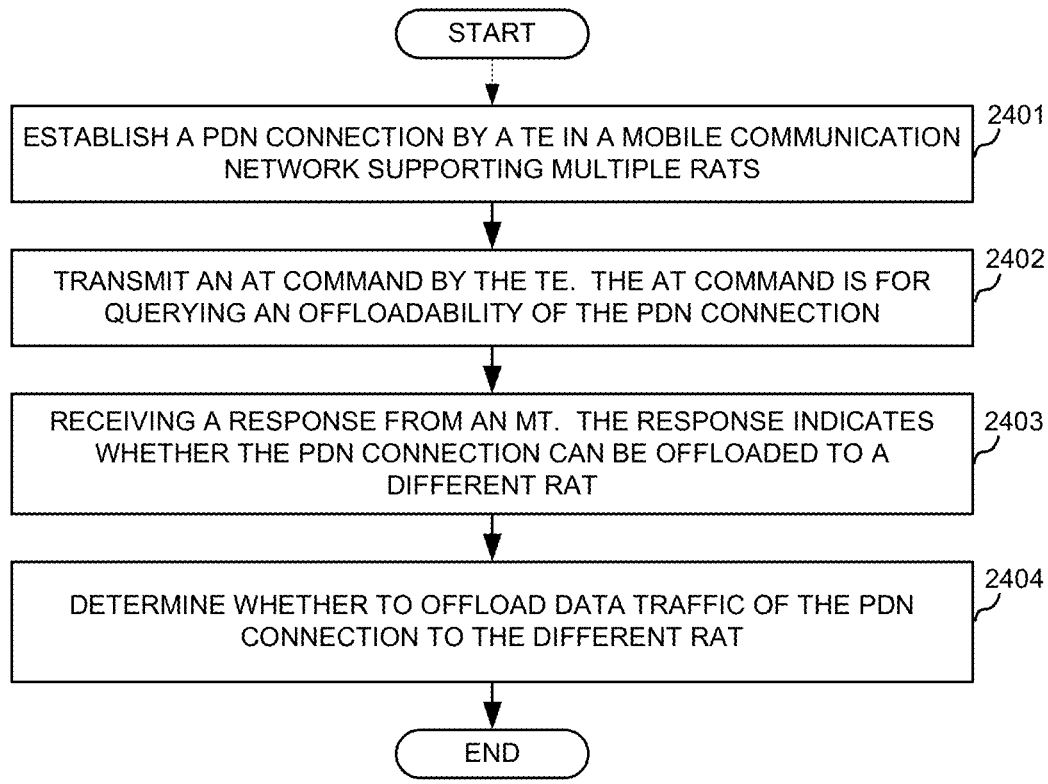
FIG. 24 is a flow chart of a method of controlling PDN connection offloadability reporting from TE perspective in accordance with one novel aspect.

FIG. 24 is a flow chart of a method of controlling PDN connection offloadability reporting from TE perspective in accordance with one novel aspect. In step 2401, a terminal equipment (TE) establishes a PDN connection in a mobile communication network supporting multiple RATs. In step 2402, the TE transmits an AT command to an MT. The AT command is for querying an offloadability of the PDN connection. In step 2403, the TE receives a response from the MT. The response indicates whether the PDN connection can be offloaded to a different RAT. In step 2404, the TE determines whether to offload data traffic of the PDN connection to the different RAT.

Figure 25:
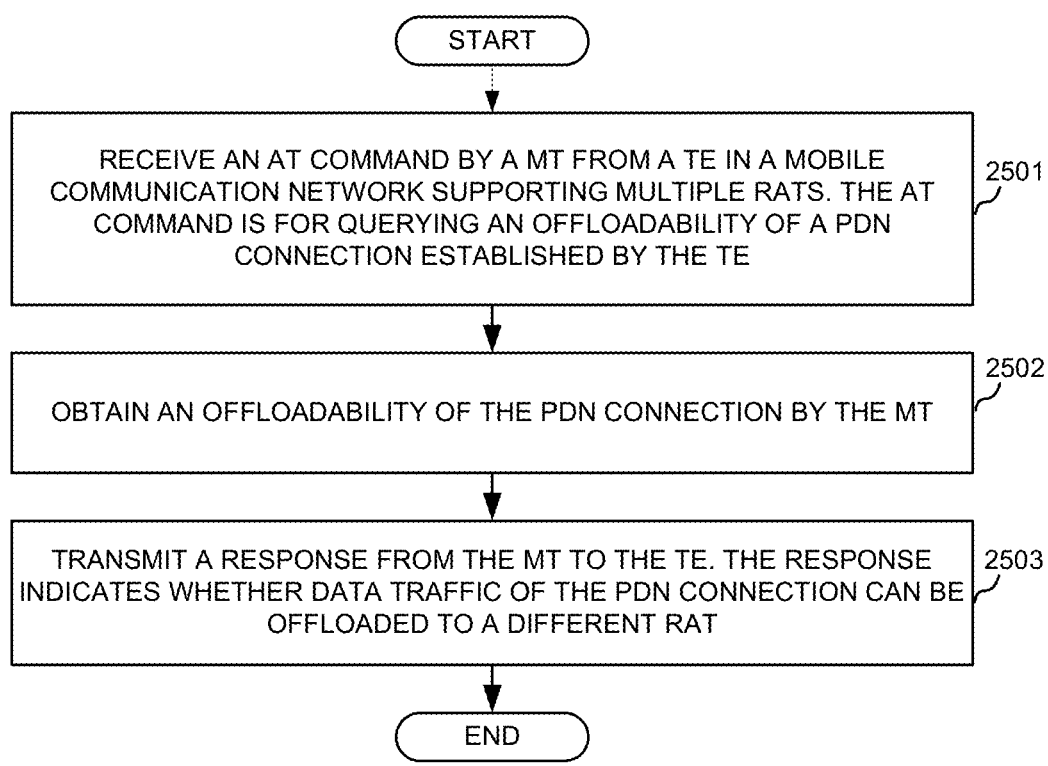
FIG. 25 is a flow chart of a method of controlling PDN connection offloadability reporting from MT perspective in accordance with one novel aspect.

FIG. 25 is a flow chart of a method of controlling PDN connection offloadability reporting from MT perspective in accordance with one novel aspect. In step 2501, a mobile termination (MT) receives an AT command from a TE in a mobile communication network supporting multiple RATs. The AT command is for querying an offloadability of a PDN connection established by the TE. In step 2502, the MT obtains the offloadability of the PDN connection. In step 2503, the MT transmits a response to the TE. The response indicates whether data traffic of the PDN connection can be offloaded to a different RAT.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
  establishing a packet data network (PDN) connection by a terminal equipment (TE) in a mobile communication network supporting multiple radio access technologies (RATs);
  transmitting an ATtention (AT) command by the TE, wherein the AT command is for querying an offloadability of the PDN connection;
  receiving a response from a mobile termination (MT), wherein the response indicates whether the PDN connection can be offloaded to a second RAT from a first RAT, wherein the AT command comprises a field that indicates the offloadability of the PDN connection of a 3G or 4G system; and
  determining whether to offload data traffic of the PDN connection to the second RAT.

2. The method of claim 1, wherein the offloadability of the PDN connection is obtained via Non-Access-Stratum (NAS) signaling with a mobility management entity (MME).

3. The method of claim 2, wherein the PDN connection is established in a 3G system, and wherein the NAS signaling involves receiving the response embedded in an activate packet data protocol (PDP) context accept or a modify PDP context request message.

4. The method of claim 2, wherein the PDN connection is established in a 4G system, and wherein the NAS signaling involves receiving the response embedded in an activate default evolved packet system (EPS) bearer context request or a modify EPS bearer context message.

5. The method of claim 1, wherein the second RAT is a wireless local area network (WLAN).

6. A terminal equipment (TE) comprising:
  a connection handler that establishes a packet data network (PDN) connection in a mobile communication network supporting multiple radio access technologies (RATs);
  a transmitter that transmits an ATtention (AT) command by the TE, wherein the AT command is for querying an offloadability of the PDN connection;
  a receiver that receives a response from a mobile termination (MT), wherein the response indicates whether the PDN connection can be offloaded to a second RAT from a first RAT, wherein the AT command comprises a field that indicates the offloadability of the PDN connection of a 3G or 4G system; and
  a RAT selector that determines whether to offload data traffic of the PDN connection to the second RAT.

7. The TE of claim 6, wherein the offloadability of the PDN connection is obtained via Non-Access-Stratum (NAS) signaling with a mobility management entity (MME).

8. The TE of claim 7, wherein the PDN connection is established in a 3G system, and wherein the NAS signaling involves receiving the response embedded in an activate packet data protocol (PDP) context accept or a modify PDP context request message.

9. The TE of claim 7, wherein the PDN connection is established in a 4G system, and wherein the NAS signaling involves receiving the response embedded in an activate default evolved packet system (EPS) bearer context request or a modify EPS bearer context message.

10. The TE of claim 6, wherein the second RAT is a wireless local area network (WLAN).

11. A method comprising:
  receiving an ATtention (AT) command by a mobile termination (MT) from a terminal equipment (TE) in a mobile communication network supporting multiple radio access technologies (RATs), wherein the AT command is for querying an offloadability of a packet data network (PDN) connection established by the TE;
  obtaining the offloadability of the PDN connection by the MT; and
  transmitting a response from the MT to the TE, wherein the response indicates whether data traffic of the PDN connection can be offloaded to a second RAT from a first RAT, wherein the AT command comprises a field that indicates the offloadability of the PDN connection of a 3G or 4G system.

12. The method of claim 11, wherein the MT obtains the offloadability of the PDN connection via Non-Access-Stratum (NAS) signaling with a mobility management entity (MME).

13. The method of claim 12, wherein the PDN connection is established in a 3G system, and wherein the NAS signaling involves receiving the response embedded in an activate packet data protocol (PDP) context accept or a modify PDP context request message.

14. The method of claim 12, wherein the PDN connection is established in a 4G system, and wherein the NAS signaling involves receiving the response embedded in an activate default evolved packet system (EPS) bearer context request or a modify EPS bearer context message.

15. The method of claim 11, wherein the second RAT is a wireless local area network (WLAN).

16. A mobile termination (MT) comprising:
a receiver that receives an ATtention (AT) command from a terminal equipment (TE) in a mobile communication network supporting multiple radio access technologies (RATs), wherein the AT command is for querying an offloadability of a packet data network (PDN) connection established by the TE, wherein the MT also obtains the offloadability of the PDN connection; and
a transmitter that transmits a response from the MT to the TE, wherein the response indicates whether data traffic of the PDN connection can be offloaded to a second RAT from a first RAT, wherein the AT command comprises a field that indicates the offloadability of the PDN connection of a 3G or 4G system.

17. The MT of claim 16, wherein the MT obtains the offloadability of the PDN connection via Non-Access-Stratum (NAS) signaling with a mobility management entity (MME).

18. The MT of claim 17, wherein the PDN connection is established in a 3G system, and wherein the NAS signaling involves receiving the response embedded in an activate packet data protocol (PDP) context accept or a modify PDP context request message.

19. The MT of claim 17, wherein the PDN connection is established in a 4G system, and wherein the NAS signaling involves receiving the response embedded in an activate default evolved packet system (EPS) bearer context request or a modify EPS bearer context message.

20. The MT of claim 16, wherein the second RAT is a wireless local area network (WLAN).

* * * * *